Feb. 7, 1939.    J. J. CHAPMAN    2,146,418
INDEPENDENTLY STEERABLE WHEEL SUSPENSION AND
THE STRAIGHT LINE MECHANISM THEREFOR
Filed July 31, 1934    4 Sheets-Sheet 4
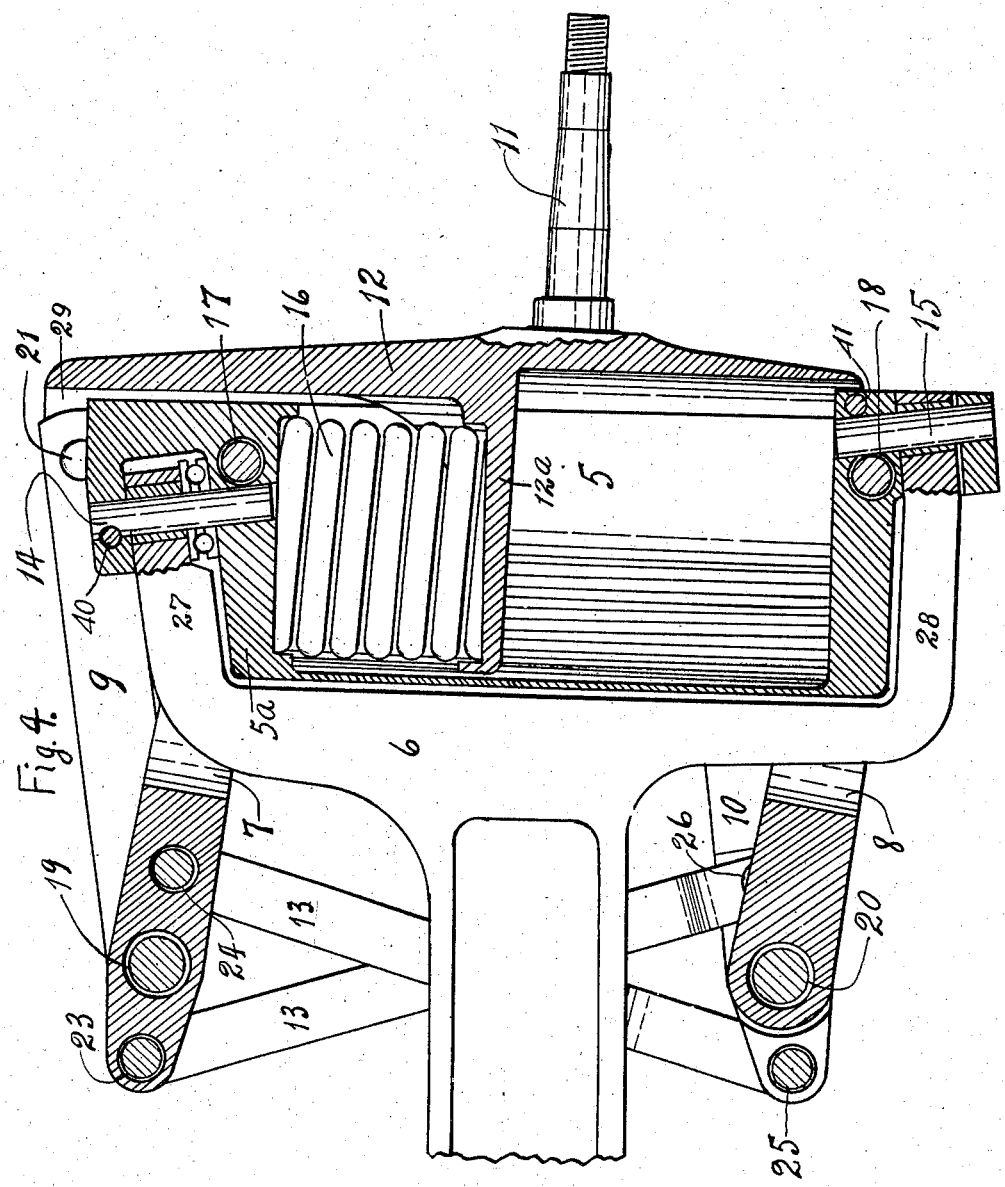

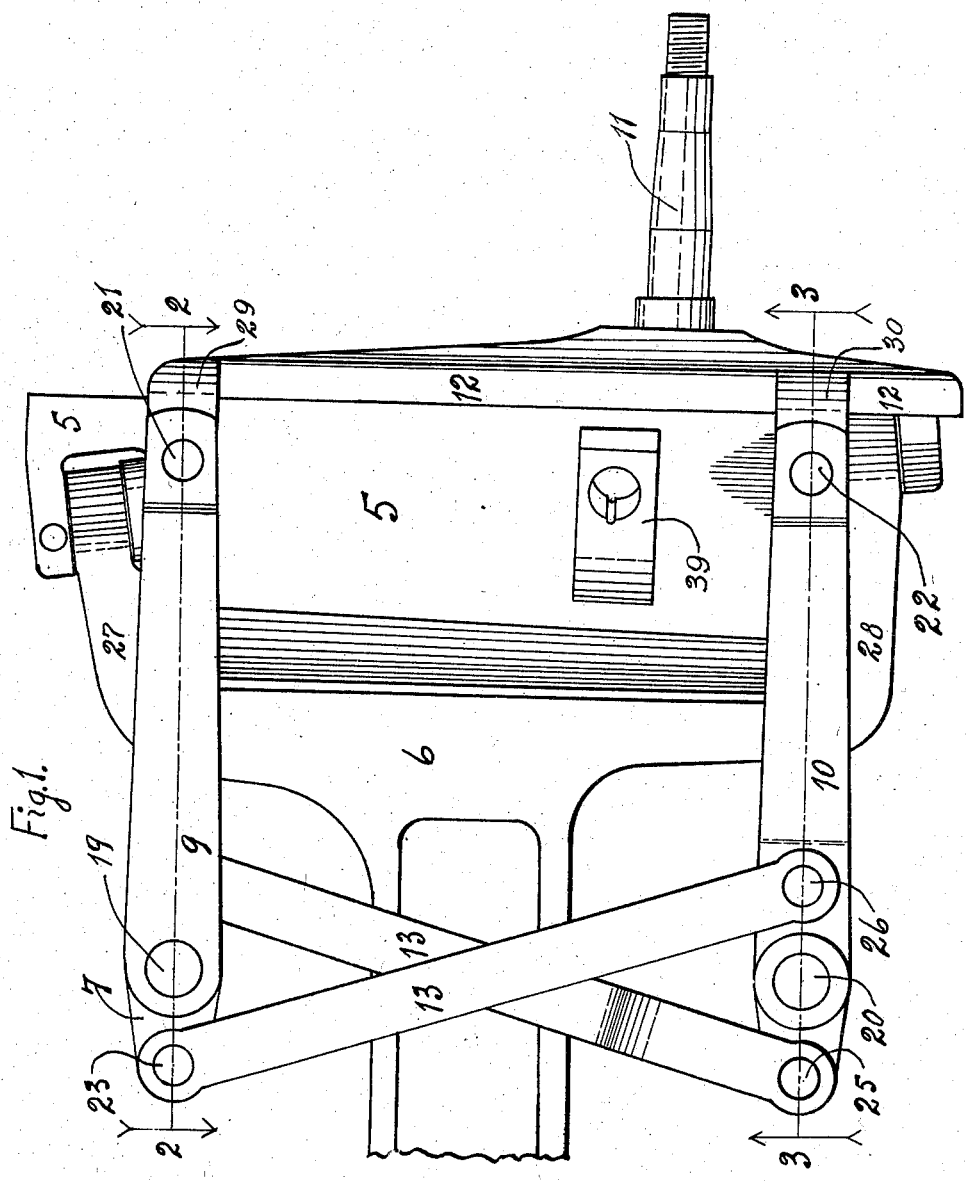

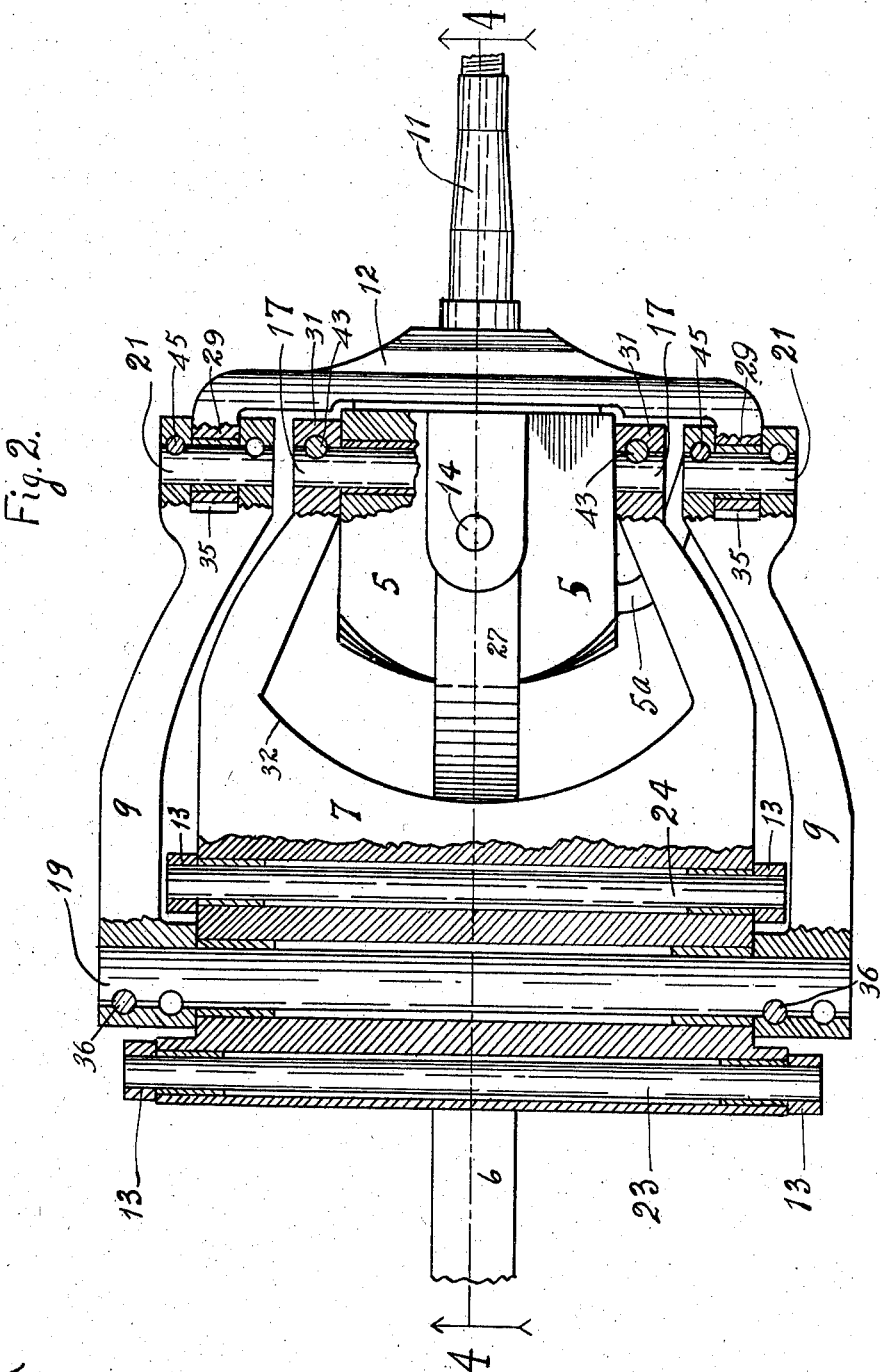

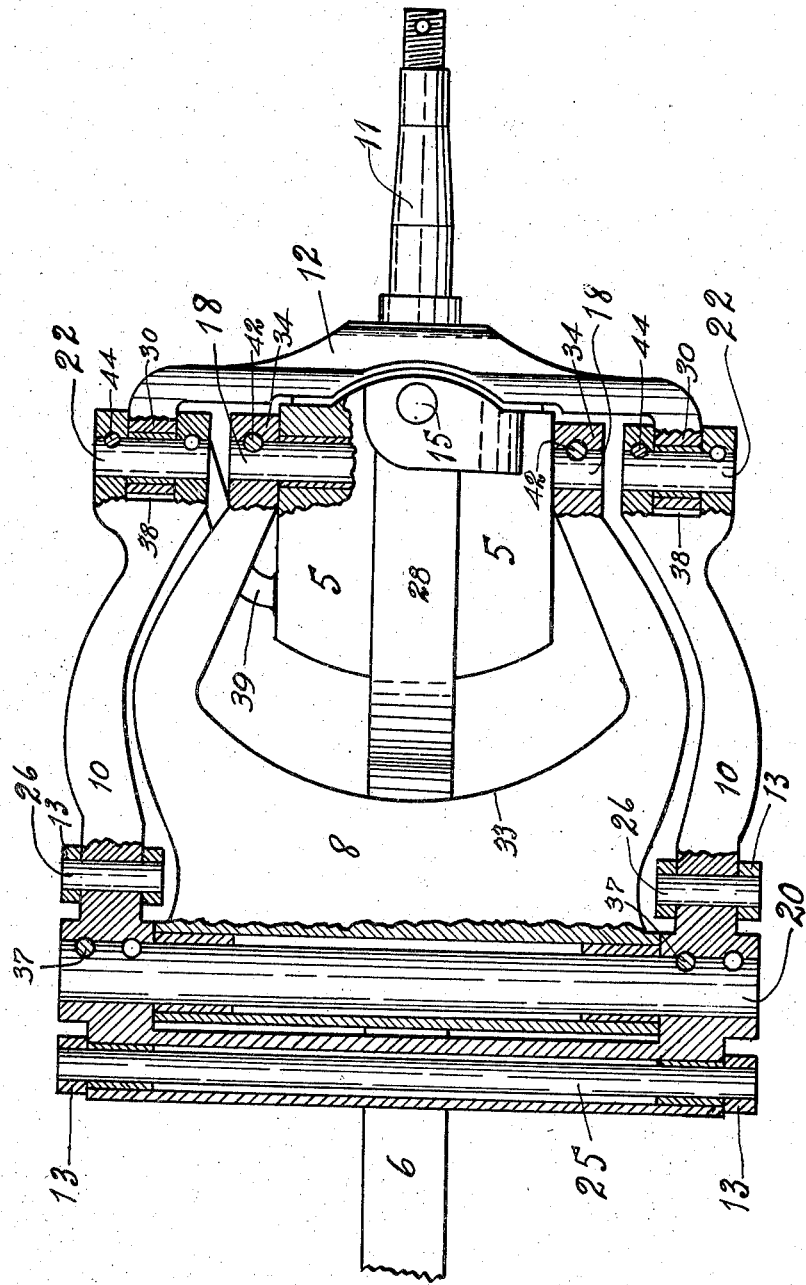

Patented Feb. 7, 1939

2,146,418

UNITED STATES PATENT OFFICE

2,146,418

INDEPENDENTLY STEERABLE WHEEL SUSPENSION AND THE STRAIGHT LINE MECHANISM THEREFOR

James Judson Chapman, Elizabeth, La.

Application July 31, 1934, Serial No. 737,714

10 Claims. (Cl. 280—96.2)

An object of my invention is the production of an all pivotally mounted vehicle wheel suspension that will allow a wheel mounted thereon to act independently of its companion wheel in its road, or spring, action, and while allowing freedom of movement substantially perpendicular to the base of the vehicle, except for the outward tilt of the wheel while rounding a curve, deliberately produced by tilted steering pins, or trunnions, maintains the line of travel of the said wheel, while so acting, in a straight line substantially perpendicular to the base of the said vehicle and parallel to that of its companion wheel, thus maintaining the lines of travel of the said wheels at a substantially fixed distance, one from the other, thereby greatly reducing the usual gyroscopic disturbances and side-sway, and producing improved steering and driving conditions.

Another important object of my invention is to effect the elimination of any direct connection between the steering rods and the spindle-body and thereby effecting the elimination of wheel wobble and shock in the steering mechanism, caused by the vertical travel of the wheel when one end of the said rods is directly connected to the said spindle-body.

Another object of my invention is to provide an axle having a substantially U-shaped end for the reception of a steering-shell and an upper and a lower fork arm, apertured for steering pins for flexibly connecting the said steering-shell to the said axle.

Another important object of my invention is to provide a steering-shell, the said steering-shell being recessed in one side for the reception of a coil spring, and a lower spring seat therefor projecting thereinto from a spindle-body, an upper seat for the said spring being provided in the upper end of the said steering-shell, the said steering-shell being substantially vertically apertured at its ends for steering pins for pivotally connecting the said steering-shell to the above described axle, and horizontally apertured at each end for flexibly connecting the said steering-shell to a spindle-body and means provided, preferably on its rear side, for attachment thereto of a steering arm.

Another object of my invention is to provide a spindle-body having a spindle cast integrally therewith, or otherwise rigidly attached thereto, to which a wheel assembly, not shown in the drawings, is revolvably attached, the said spindle-body having a seat projecting into the above mentioned steering-shell for the lower end of a coil spring, and two upper and two lower fork arms, the said fork arms being horizontally apertured for flexibly connecting the said spindle-body to the above mentioned steering-shell through means provided therefor.

Another object of my invention is to provide a coil spring having its lower end mounted in a seat projecting from a spindle-body into an open side of a steering-shell and its upper end bearing upwardly in a seat in the upper end of the said steering-shell to flexibly sustain its load.

Another important object of my invention is to provide means for making such pivotal connection of the above described spindle-body to the above described steering-shell as will allow the said spindle-body to move freely in its road, or spring, action, while maintaining the said spindle-body, during said action, except for the outward tilt of the wheel when rounding a curve, in a straight line of travel, or path, substantially perpendicular to the base of the vehicle to which it is attached, and maintaining the path of the wheel which is mounted on the said spindle-body, parallel to, and a fixed distance from, a similar path of its companion wheel.

Other objects and advantages of my invention will be apparent during the course of the following detailed description.

In the accompanying drawings, forming a part of this specification, and in which like reference characters designate like parts throughout the same:

Figure 1 is the rear elevation of an independently acting, all pivotally mounted, straight line travel, independently steerable automotive front wheel suspension showing its movable members in the center of their travel.

Figure 2 is a horizontal section taken substantially on the line 2—2 of Figure 1, the lower link assembly not being shown.

Figure 3 is a horizontal section taken substantially on the line 3—3 of Figure 1, the upper link assembly not being shown.

Figure 4 is a vertical section taken on the line 4—4 of Figure 2.

In the drawings, wherein for the purpose of illustration, is shown a preferred embodiment of my invention, the numeral 6 designates an axle, one end thereof only being shown, the said end having an upper and lower fork arm 27, 28 defining a substantially U shaped opening for the reception of a steering-shell or member 5. Each of the fork arms is apertured for the upper and lower steering pins 14 and 15 respectively, the said pins 14 and 15 pivotally connecting the said steering-shell to the said axle, the intermediate portion of the said axle being of any suitable construction for attachment to the particular vehicle on which it is used.

In Figs. 1, 2, 3 and 4, is shown steering-shell 5, recessed in one side for the reception of a coil spring 16 and for a lower spring seat 12a therefor projecting thereinto from a spindle-body 12, an upper seat 5a for the said spring being provided at the upper end of the said recess, the said steering-shell having bifurcations at its ends for the reception of the upper and lower fork arms 27, 28 of the axle 6, and apertures at each end for the steering pins 14 and 15 for pivotally connecting the said steering-shell 5 and the axle 6, the said pins 14 and 15 in practice being rigidly secured to the steering-shell 5 with taper pins 40, 41, the said steering-shell 5 being horizontally apertured at its upper and lower ends for the pins 17 and 18 respectively for flexibly connecting the said steering-shell, through suitable means, to a spindle-body 12.

The spindle-body 12 has a spindle 11 cast integrally therewith, or otherwise rigidly attached thereto, the said spindle-body having a seat 12a projecting into the above mentioned steering-shell for the support of the lower end of a coil spring 16. Two upper and two lower fork arms 29, 30 are horizontally apertured for the pins 21 and 22 respectively, for flexibly connecting the said spindle-body 12 to the above mentioned steering-shell 5 through means provided therefor and presently described.

The above mentioned means for flexibly connecting the above described spindle-body 12 to the above described steering-shell 5, that will admit of a substantially vertically reciprocating motion in the said spindle-body in a relatively straight line or path parallel to the said steering-shell, while otherwise maintaining the said spindle-body in its relative position to the said steering-shell, consists of the following structure. An upper link 7 is bifurcated at 32 (Fig. 2) for the reception of the fork arm 27 of the axle 6 and the steering-shell 5. The upper link 7 has two fork arms 31 (Fig. 2), which are disposed at the sides of the steering-shell 5 and are horizontally apertured for the reception of the pin 17 for pivotal connection with the upper end of the steering-shell 5. The opposite end of the said link 7 is horizontally apertured for the reception of the pivot pin 19 and for the pins 23 and 24 (Fig. 2). A lower link 8 (Fig. 3) is bifurcated at 33 for the reception of the fork arm 28 of the axle 6 and the steering-shell 5. Said link has two fork arms 34 which are disposed at the sides of the steering-shell 5 and are horizontally apertured for the reception of the pin 18 for pivotal connection with the lower end of the steering-shell 5. The opposite end of the said link 8 is horizontally apertured for the reception of the pivot pin 20. An upper link 9 comprises two arms, each of the said arms being apertured at one end for the reception of the pivot pin 19, to which they are rigidly secured by taper pins or bolts 36, the said pin 19 forming a pivotal connection between the links 7 and 9, the said arms of the link 9 being disposed about the link 7, the opposite ends thereof being vertically slotted at 35 for the reception of the upper fork arms 29 of the spindle-body 12 and being horizontally apertured for the reception of the pins 21 for pivotal connection with the upper arms of the spindle-body 12. A lower link 10 of substantial U shape has two arms which are disposed about the lower link 8 (Fig. 3), one end of the said lower link 10 being horizontally apertured for the reception of the pins 20, 25 and 26, the said pin 20 being rigidly secured thereto by taper pins, or bolts 37, and forming a pivotal connection between the links 8 and 10. The opposite ends of the said arms are vertically slotted at 38 for the reception of the lower fork arms 30 of the spindle-body 12, and horizontally apertured for the reception of the pins 22 for pivotal connection with the lower fork arms of the spindle-body 12. Two pairs of crossed links 13, are horizontally apertured at each end for the reception of the pins 23, 24 (Fig. 2), 25 and 26 (Fig. 3), to which they are rigidly secured with pins, not shown, one pair of the said crossed links being connected at their upper ends with the pin 23 to the upper link 7, their opposite ends being pivotally connected through the pins 26 to the lower link 10. The other pair of the said crossed links is pivotally connected at their upper ends through the pin 24 to the upper link 7, their opposite ends being pivotally connected through the pin 25 to the lower link 10.

In this disclosure, it will be seen that the links 7, 8, 9 and 10 have equal pivotal lengths, and by reference to Figure 1 of the drawings, it will be seen that, with all parts thereof in their intermediate positions, all pivotal connections in the upper link assembly 7 and 9 lie in the same horizontal plane, that all pivotal connections in the lower link assembly 8 and 10 lie in the same horizontal plane, that all pivotal connections in the upper link assembly 7 and 9 are the same distances from similar pivotal connections in the lower link assembly 8 and 10, that the two pairs of crossed links 13 have the same pivotal lengths, and the pivotal distance from the pin 23 to the pin 24, with the pin 19 as a center, is equal to the pivotal distance from the pin 25 to the pins 26, with the pin 20 as a center. The above described arrangement of parts and relative pivotal distances is a preferred construction but desirable changes which do not depart from the spirit of my invention may be made.

It will now be seen by referring to Figure 1 of the drawings that, as the pivotal connections 21 and 22 of the links 9 and 10 move upwardly with the spindle-body 12, and the pivotal connections 17 and 18 of the links 7 and 8 remain relatively stationary with the steering-shell 5, the pins 25 and 26 will move in counterclockwise arcs about the pivotal center 20, that the pins 25 and 26 being connected through two pairs of crossed links 13 to the pins 24 and 23 respectively in the link 7, that the pins 24 and 23 will be caused to move in equal clockwise arcs around the pivotal center 19.

It is now evident that the action of the crossed links 13 will cause the links 7 and 10 at all positions in their vertical travel to form like angles from horizontal bases, but in opposite directions, that, as the link 7 is caused to move around the movable center 19 while the pivotal connection 17 remains stationary, the movable center 19 is caused to move upwardly in a vertical plane in a clockwise arc about the center 17. As the pin 20 is maintained constantly at a substantially fixed distance from the pin 19, the pin 20 will also describe a clockwise arc in a vertical plane about the center 18. The link 9, being pivotally connected at one end to the upper end of the spindle-body 12, its opposite end being pivotally connected to the link 7, is maintained constantly at the same angle from a horizontal base as that of the link 10. Therefore, as the spindle-body 12 moves upwardly the pivot pins 19 and 20 describe clockwise arcs in a substantially vertical plane about the centers 17 and 18 respectively, and the pins 21 and 22 move in a vertically straight line as they describe equal counter-clockwise arcs about the movable centers 19 and 20 respectively, therefore, as the displacement of 19 and 20 in the first mentioned arcs are, at all points, equal to the displacement, but in opposite directions of pins 21 and 22 in the last mentioned arcs, the spindle-body 12, if moved in a vertically reciprocating manner, will travel in a relatively straight line, or path, parallel to the steering-shell to which it is flexibly attached. When the spindle-body 12 moves below its intermediate position the above described action is repeated in an opposite direction.

It is now seen, in the combination of parts in my invention, that the axle 6, with its steering pins, or trunnions 14 and 15, is a relatively fixed member, the other members thereof being movable in a substantially horizontally circular swinging motion about the steering pins 14, 15, or trunnions 14 and 15, in the said axle.

With further reference to the straight line action mechanism, above described, it is shown that the straight line action is produced by two pairs of links, or their equivalents, acting in opposite directions, one pair of links thereof counteracting the action of the other pair of links, the said opposed motion being produced in its simplest and most practical form by the crossed links 13. If the links 13 are made relatively shorter, the reciprocally movable member 12 will be caused to travel in a convexed arc. If the links 13 are made relatively longer, the reciprocally movable member 12 will be caused to move in a concaved arc.

By referring again to the drawings, it will be seen that there is no direct connection between the steering mechanism of the vehicle, to which my invention is attached, and the substantially vertically reciprocating spindle-body 12, there being an intermediate member 5 positioned between the said spindle-body 12 and the above described axle 6, the said spindle-body 12 being so connected to the said intermediate member 5 as to admit of its substantially perpendicular travel, parallel to the said intermediate member 5, the said intermediate member 5 being also connected through steering pins 14 and 15 to the axle 6 and a connection for the above mentioned steering mechanism provided on the intermediate member 5 at 39 in Figure 1 through which to actuate the said intermediate member 5.

To assemble my invention, progressively, place the steering-shell 5 in position in the axle 6, place the ball thrust bearing in position, insert the pin 14 and secure the pin 14 rigidly to the steering-shell 5 with taper pins or bolts 40; insert the pin 15 and secure it to the steering-shell 5 with taper pins or bolts 41; place the link 8 in position and insert the pin 18 and secure the pin 18 rigidly to the link 8 with taper pins or bolts 42; place the link 10 in position, insert the pin 20 and secure the said pin 20 to the said link 10 with the taper pins or bolts 37; place the link 7 in position and insert the pin 17 and secure the said pin 17 rigidly to the link 7 with taper pins or bolts 43; insert the pins 24 and 25 and press thereon a pair of links 13 and secure the said links 13 rigidly to the said pins 24 and 25 in any suitable manner; secure the ends of the other pair of links 13 to the link 10 with the pins 26 and suitably secure the pins 26 rigidly to the links 13, and insert the pin 23 in the link 7 and press the upper ends of the said links 13 thereon and rigidly suitably secure the said links to the said pin 23; insert the pin 19 in the link 7, press the arms of the link 9 onto the pin 19 and secure the said arms rigidly to the pin 19 with the taper pins or bolts 36; place the spring 16 on its seat 12a on the spindle-body 12, insert the spring and said seat into the open side of the steering-shell 5 and place the spindle-body 12 in position; insert the pins 22 and secure them rigidly to the link 10 with taper pins or bolts 44; insert the pins 21 and secure them rigidly to the link 9 with taper pins or bolts 45.

To disassemble my invention reverse the above proceeding.

As above stated, while this specification has especial reference to automotive front wheels, my invention is intended for various other uses for which it is adaptable and when used for non-steerable, or other wheels not requiring the steering-shell, the said steering-shell 5, with its steering connections, may be eliminated and the spindle-body 12 may be attached directly to the axle 6 in a manner similar to the way it is now attached to the steering-shell 5.

I have shown the pivotal connections in my invention fitted with a commonly used type of pivotal pins and bushings, the said pivotal pins being secured in their relative positions by tapered pins, or tapered bolts, through tapered holes drilled therefor, the said tapered holes preferably being drilled partly in the said pivotal pins and partly in the members to which they are rigidly attached. It is understood, however, that as my invention is intended for use on various kinds of vehicles, as well as other uses for which it is adaptable, the said pivotal pins, bushings and taper pins may have any of the well known equivalents substituted therefor, and that such changes as are necessary for adapting my invention to its various requirements, without departing from the spirit of my invention, may be made.

In this specification, one wheel suspension only is shown, it being understood that its companion wheel suspension is similar, but constructed in an opposite direction, the intermediate portion of the axle thereof being of any suitable construction for the particular vehicle on which it is used.

Having now described my invention and ascertained its function, what I claim is:

1. In a vehicle wheel suspension, the combination with a frame, of a steering member, and means supporting said steering member on said frame for swinging movement in a generally horizontal plane, the said means comprising a steering pin between the frame and steering member, a wheel carrying member for a steerable road wheel, and means connecting said wheel carrying member to an adjacent steering member for rising and falling movement with respect thereto, for maintaining the said road wheel in straight line, parallel, vertical path during such movement, the said means also comprising a plurality of links, each having articulated connection with the said steering member and extending inwardly therefrom for swinging movement in a generally transverse vertical plane and a plurality of links each having articulated connection with the first links and extending outwardly therefrom and having articulated connection with the said wheel carrying member for swinging movement in a generally transverse vertical plane with relation to said vehicle when said steering member is in a mid position, and means mounted on the inner ends of the first and second pluralities of links for guiding them synchronously in opposite directions, the lateral movement of the first links counteracting the lateral movement of the second links.

2. In a wheel suspension, the combination with a frame, of a steering member having articulated connection with said frame, a wheel carrying member, means connecting said wheel carrying member to said steering member for rising and falling movement in a straight line, substantially vertical, path with respect thereto, said means comprising a pair of vertically spaced links having articulated connection with said steering member and extending inwardly therefrom for swinging movement in substantially vertical planes and a pair of vertically spaced links having articulated connection with said wheel carrying member and extending inwardly therefrom for swinging movement in substantially vertical planes, when said steering member is in a mid position, and articulated connections between the inner ends of the upper and of the lower links respectively, and means mounted on the inner ends of the first and last links for maintaining them at substantially like but oppositely directed angles to a horizontal plane, the said means comprising a pair of crossed links, each having articulated connections with one frame connected link and one wheel carrying member connected link.

3. In a wheel suspension, the combination with a frame, of a steering member having pivotal connection with said frame for swinging movement in a generally horizontal plane, a wheel carrying member, and means connecting said wheel carrying member to said steering member for rising and falling movement with respect thereto, said means comprising a pair of vertically spaced links having pivotal connections with said steering member and extending inwardly therefrom for swinging movement in substantially vertical planes and a pair of vertically spaced links having pivotal connections with said wheel carrying member and extending inwardly therefrom for swinging movement in substantially vertical planes when said steering member is in a mid position, and pivotal connections between the inner ends of the upper and of the lower links respectively, and means mounted on the inner ends of the first and last links for maintaining them at like but oppositely directed angles to a horizontal plane, the said means comprising a pair of crossed links, each having pivotal connections with one steering member connected link and one wheel carrying member connected link.

4. In a wheel suspension, the combination with a wheel carrying member, of a member fixed with relation thereto, and means connecting said wheel carrying member to said fixed member for rising and falling movement with respect thereto, in a substantially vertical straight line path, the said means comprising a pair of links having pivotal connections with said fixed member and extending inwardly therefrom for swinging movement in generally vertical planes and a second pair of links having pivotal connections with said wheel carrying member and extending inwardly therefrom for swinging movement in generally vertical planes, and pivotal connections between the inner ends of the upper links and of the lower links of each pair respectively, and means mounted on the first and second links for maintaining them at substantially like angles but oppositely directed from a horizontal plane, the said means comprising crossed links, each having pivotal connections in the pivotal planes of one fixed member connected link and one reciprocating member connected link, and means between the said wheel carrying member and the said fixed member to flexibly sustain its load.

5. In a straight line mechanism, the combination with a reciprocating member, of a member fixed with relation thereto, and means connecting said reciprocating member to said fixed member for guiding it in a substantially straight line path, said means comprising a pair of links having pivotal connection with each other at one end, the opposite end of one link thereof having pivotal connection with said fixed member and the opposite end of the other link having pivotal connection with said reciprocating member, and a second pair of links having a pivotal connection with each other at one end, the opposite ends of the respective links being pivoted to the fixed and reciprocating members, the pivotal connections of the first and second pairs of links lying on substantially parallel axes, the pivotal connections of said pairs of links to the respective fixed and reciprocating members being substantially in the same vertical plane, and the pivotal connections of each pair of the said links being in planes substantially at right angles to said vertical plane when in mid positions, and means mounted on the first and second links for maintaining the fixed member connected links and the reciprocating member connected links at like but oppositely directed angles from their mid positions, the said means comprising crossed links, each having pivotal connection with one of the fixed member connected links and one of the reciprocating member connected links, the said connections being substantially equally spaced from the pivotal connections of the first and the second links.

6. In a vehicle wheel suspension, the combination with a frame, of a steering member, and means connecting said steering member to said frame for swinging movement in a generally horizontal plane, said means comprising articulated connections therebetween, a wheel carrying member, and means connecting said wheel carrying member to said steering member for guiding it in a straightline path substantially parallel to the longitudinal and transverse vertical planes of the said vehicle when said steering member is in the mid position, said means comprising articulated connections between the steering member and wheel carrying member, including two sets of links for swinging movement substantially parallel to the transverse vertical plane of the said vehicle, means mounted on said two sets of links for guiding their movements in opposite directions, and means between the said steering and wheel carrying members for elastically supporting a load.

7. In a mechanism for guiding a reciprocating member in a predetermined path, the combination with said reciprocating member, of a member fixed with relation thereto, and means connecting said reciprocating member to said fixed member, the said means comprising a pair of links having pivotal connections with the said fixed member and a pair of links having pivotal connections with said reciprocating member and the first said links for swinging movement generally in the same plane, the said pivotal connections lying on substantially parallel axes, the connections in the fixed member and in the reciprocating member being substantially in the same plane and the pivotal connections in the said links being in planes at right angles to the first said plane when in mid positions, and means mounted on the first and second links for guiding them synchronously in opposite directions.

8. In a vehicle wheel suspension, the combination with a frame, of a steering member, means connecting said steering member to said frame, a wheel carrying member, and means connecting said wheel carrying member to the steering member for rising and falling movement with respect thereto in a straight line path, substantially parallel to the longitudinal and transverse vertical planes of the said vehicle, the said means comprising a pair of vertically spaced links having pivotal connections with said steering member and extending inwardly therefrom for swinging movement in generally vertical planes, a pair of vertically spaced links having pivotal connections with the inner ends of the first said links and extending outwardly therefrom and having pivotal connections with said wheel carrying member for swinging movement in generally vertical planes, the pivotal connections in the steering member and in the wheel carrying member being in a substantially vertical plane, and means for guiding the movements of the first and last links synchronously in opposite directions.

9. In a mechanism for guiding a reciprocating member in a predetermined path, the combination with said reciprocating member, of a member fixed with relation thereto, and means connecting said reciprocating member to said fixed member, said means comprising a pair of links having pivotal connection with said fixed member, a pair of links having pivotal connections with said reciprocating member and with pivotal connections with the first-named pair of links for swinging movement, and crossed means connecting the pairs of links at opposite sides of the last named pivotal connections for guiding the swinging of said pairs of links synchronously in opposite directions.

10. In a mechanism for guiding a reciprocating member in a predetermined path, the combination with said reciprocating member, of a member fixed with relation thereto, and means connecting said reciprocating member to said fixed member, the said means comprising a pair of links having pivotal connections with the said fixed member and a link having a pivotal connection with said reciprocating member and one of the first said links for swinging movement, the said pivotal connections lying on substantially parallel axes, the connections in the fixed member and in the reciprocating member being substantially in the same plane and the pivotal connections in said links being in planes at right angles to the first said planes, when in their mid positions, and means mounted on the first and second links for guiding them synchronously in opposite directions.

JAMES JUDSON CHAPMAN.